May 12, 1964
S. A. COGSDILL
3,132,543
DEBURRING TOOL
Filed Aug. 1, 1960
2 Sheets-Sheet 1
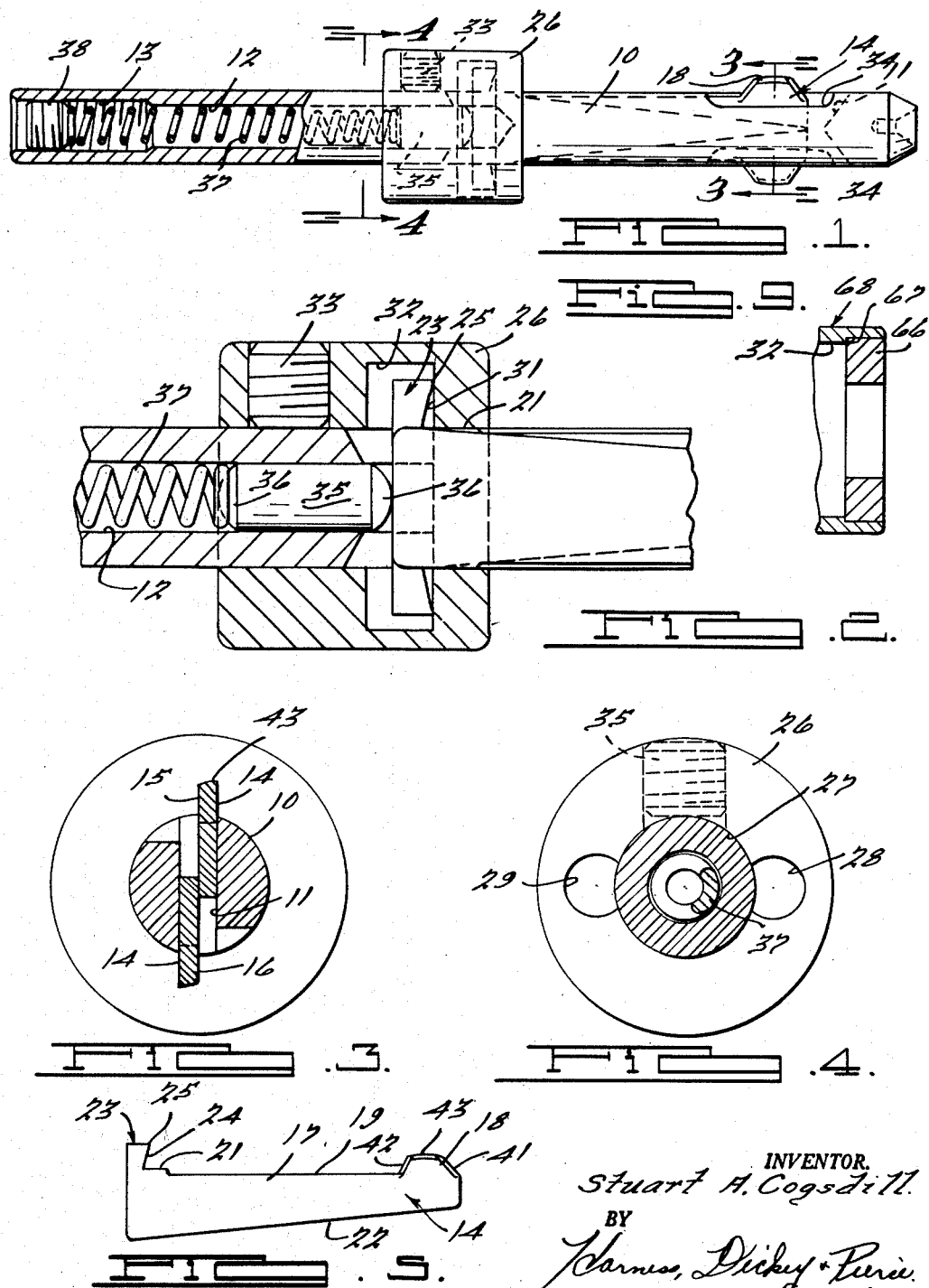
INVENTOR.
Stuart A. Cogsdill
BY
Harness, Dickey & Pierce
ATTORNEYS.

May 12, 1964  S. A. COGSDILL  3,132,543
DEBURRING TOOL
Filed Aug. 1, 1960  2 Sheets-Sheet 2
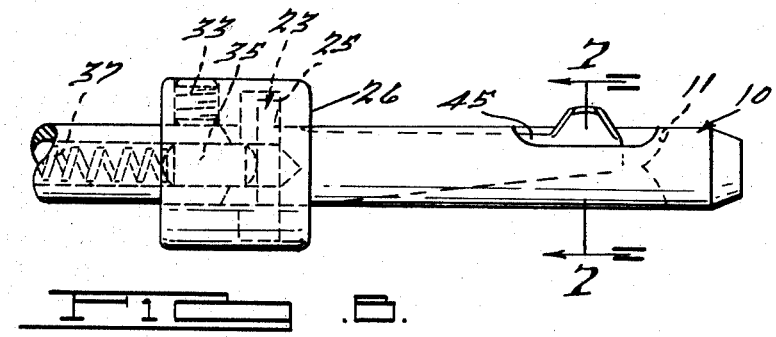
FIG. 6.
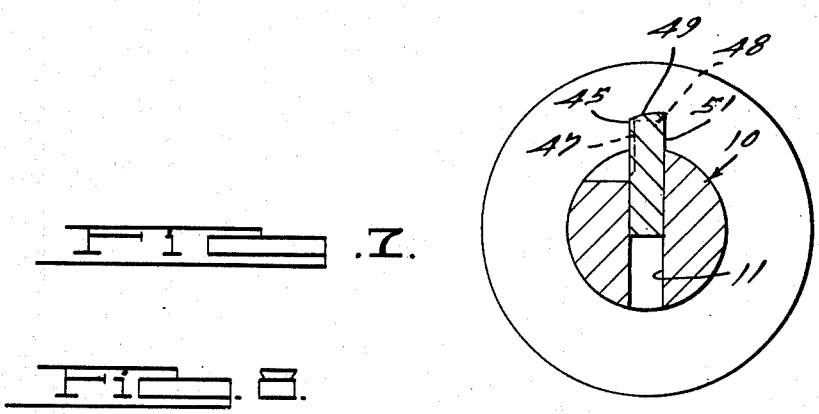
FIG. 7.
FIG. 8.
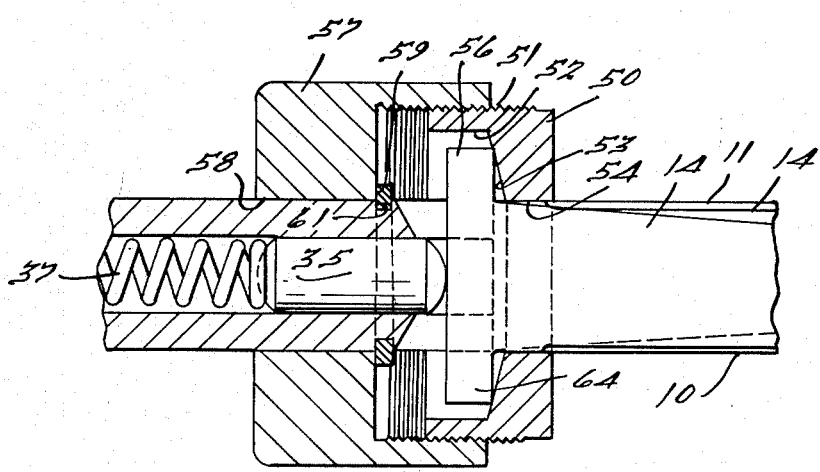
FIG. 10.
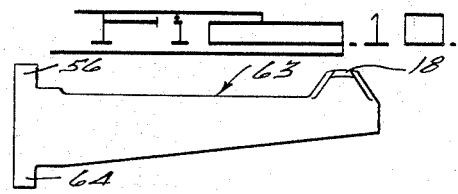
INVENTOR.
Stuart A. Cogsdill
BY
Harness, Dickey & Pierce
ATTORNEYS.

United States Patent Office 3,132,543
Patented May 12, 1964

3,132,543
DEBURRING TOOL
Stuart A. Cogsdill, Orchard Lake, Mich., assignor to Cogsdill Tool Products, Inc., Oak Park, Mich., a corporation of Michigan
Filed Aug. 1, 1960, Ser. No. 46,439
11 Claims. (Cl. 77—73.5)

This invention relates to deburring tools, and particularly to a deburring tool having a blade urged outwardly by a spring disposed in extension thereof.

A deburring tool is illustrated in the S. A. Cogsdill Patent No. 2,620,689 issued December 9, 1952, which performs the function of removing a burr formed on one or both faces of a workpiece about a hole machined therein. In this arrangement, a blade is pivoted within a slot in the body of the tool having a spring pressed plunger abutting the rear end on one side of a line through the pivot for moving the cutting nib of the blade on the other side of the pivot and the line outwardly of the slot in the body with a predetermined force. The nib of the blade has a forward and rearward cutting edge joined by an arcuate surface which is laterally crowned to function as a cam for moving the blade inwardly against the force of the spring when passing from one to the other side of the workpiece.

The deburring tool of the present invention comprises a body in the nature of a rod having a threaded aperture in one end for adjustably encasing a spring for moving a plunger against the end of a blade which extends forwardly in a slot in the body, from which a cutting nib projects. A laterally extending arm on the end of the blade opposite that having the nib has point engagement with a supporting bushing which is locked on the body. The arm performs as a fulcrum about which the blade pivots when the nib is urged outwardly by the spring with a predetermined force adjustable by a screw within the thread of the body aperture. One or a pair of blades may be employed within the slot of the body, two blades being employed when the aperture is large enough to be operated on by two blades, and a single blade being employed for the smaller apertures. When a pair of blades are employed the cutting edges are located on the center line. When a single blade is employed, the center line of the blade is located on the center of the slot with the nib relieved below the cutting edge to produce a positive rake thereto.

Accordingly, the main objects of the invention are: to provide a deburring tool constructed from a rod having a bushing secured intermediate the ends of supporting blades the nibs of which are movable outwardly of the body; to provide one or a pair of blades disposed in a slot in the body of a deburring tool with one arm extending laterally in engagement with a support to form a fulcrum about which the blades are movable; to provide a deburring tool with an elongated body having a slot at the forward end containing at least one blade and an aperture in the rear end containing spring means which applies an outward force to the nib at the forward end of the blade; and, in general, to provide a deburring tool which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a view in elevation of a deburring tool with a part in section embodying features of the present invention;

FIG. 2 is an enlarged broken sectional view of the central portion of the tool illustrated in FIG. 1;

FIG. 3 is an enlarged sectional view of the structure illustrated in FIG. 1, taken on the line 3—3 thereof;

FIG. 4 is an enlarged sectional view of the structure illustrated in FIG. 1, taken on the line 4—4 thereof;

FIG. 5 is a view of a blade illustrated in the tool of FIG. 1;

FIG. 6 is a broken view of a tool, similar to that illustrated in FIG. 1, having a single blade therein;

FIG. 7 is an enlarged sectional view of the structure illustrated in FIG. 6, taken on the line 7—7 thereof;

FIG. 8 is a view of structure, similar to that illustrated in FIG. 2, showing another form of the invention;

FIG. 9 is a broken view of structure, similar to that illustrated in FIG. 2, showing another form thereof; and FIG. 10 is a view of the blade employed in the tool illustrated in FIG. 8.

Referring to FIGS. 1 to 5, a deburring tool of the present invention has a cylindrical body 10 containing a slot 11 at its forward end and an aperture 12 at its rearward end, the outermost portion of which contains an internal thread 13. A pair of blades 14 is disposed within the slot 11, the mating faces 15 and 16 being located upon the diameter of the body 10. The blade is illustrated in FIG. 5 as comprising a body 17 having a cutting nib 18 at one end extending outwardly from a side 19. The opposite end of the side 19 is projected outwardly to form a stop 21 which limits the outward movement of the nib 18. A side 22 opposite to the side 19 tapers from one end to the other to permit the retraction of the blade in the slot when the forward end of the tool is advanced through an aperture of a workpiece to be deburred. A projecting arm 23 extends from the side 19 in the same direction as the nib 18 at the opposite end of the blade body. The arm has a sloping edge 24 to provide an outer tip 25 which acts as a fulcrum point about which the blade is swung.

A pair of blades is mounted within the slot 11, and a supporting bushing 26 having a central aperture 27 is slid over the rear end of the body 10. The forward end of the bushing has a pair of smaller apertures 28 and 29 which are diametrically disposed in communication with the aperture 27. When the arms 23 pass through the apertures 28 and 29, the bushing 26 is rotated to permit the ends 25 of the arms to engage the forward face 31 of an annular slot 32 within the forward end of the bushing. The bushing 26 is secured to the body by a setscrew 33 after the nibs 18 are located centrally of chip clearance recesses 34 at opposite sides of the slot 11 of the tool body. A plunger 35 is disposed within the aperture 112 having rounded ends 36, the forward end of which engages the rear ends of the blades on the center line of the tool body. A coil spring 37 is placed within the aperture 12 against the plunger 35, tensioned by a screw 38 within the threads 13 at the outer end of the aperture 12. The spring applies a predetermined force to the blade which is adjustable by the screw 38.

The application of force on the rear ends of the blades on the longitudinal center line thereof causes the blades to swing about the points 25 of the arms 23 and move the nibs outwardly at opposite sides of the slot 11, as illustrated in FIG. 1. This movement is limited by the stop portion 21 of the blades which engage the wall of the aperture 27 in the bushing 26. The nib 18 has a forward cutting edge 41 and a rearward cutting edge 42 with an arched portion 43 therebetween which is laterally rounded as illustrated more clearly in FIG. 3. The formation of the nib of the blade follows that of the above mentioned patent and produces the deburring of the hole at both sides of the workpiece as the blade moves from the inner to the outer side thereof without marring the surface of the aperture due to the longitudinal and lateral arch to the surface of the nib between the forward and rearward cutting edges.

The tool as illustrated in FIGS. 1–5 may be employed on apertures of ¼" and larger diameters. For smaller diameter apertures a similar deburring tool is employed, constructed as illustrated in FIGS. 6 and 7. In this type of tool, the slot 11 in the body 10 contains a single blade 45 which is similar to the blade 14, except being twice the thickness, to fill the slot 11 in the body 10. The cutting edge 46 has a recess 47 therebelow providing a positive rake, and the top is sloped at 48 to relieve the edge in the usual manner. The crown 49 of the nib 51 is arched longitudinally of the nib, as well as laterally thereof, in the manner as pointed out hereinabove. While the cutting edge 46 is not on the central diameter of the slot 11, the recess 47 inwardly of the cutting edge provides a suitable positive rake thereto. The bushing 26 retains the arms 23 of the blade on the surface 31 of the bushing so that the nib 18 will be urged outwardly of the slot 11 by the bias of the spring 37, as pointed out hereinabove.

In FIG. 7, a further form of the invention is illustrated, that wherein a threaded ring 50 has a thread 51 on its outer surface and a cylindrical aperture 52 terminating in a sloping bottom 53 having a rectangular slot 54 therethrough. After blades 63 are assembled within the slot 11 in the body 10, the ring 50 is slid upwardly thereover to have the right-angled corner 55 of the outwardly extending arms 56 engage the sloping bottom surface 53 to form a fulcrum for the blades. A locking collar 57 having an aperture 58 is slid over the opposite end of the body 10 to abut against a split ring 59 disposed within an annular groove 61 in the body. The collar 57 is threaded upon the threads 51 of the ring 50 to thereby lock the ring on the body with the spring pressed plunger 35 engaging the rear ends of the blades 63 in the manner pointed out hereinabove with regard to the tool illustrated in FIGS. 1 to 4 inclusive. The blades 63 are provided with a second arm 64 which limits the outward movement of the cutting nib 18 as well as the inward movement thereof by the adjustment of the ring 50 inwardly or outwardly of the collar 57. The addition of the arm 64 provides greater stability and assurance of the proper deflection of the blade while employing greater clearance between the blades and the ends of the slot 54 in the ring 50. In FIG. 9, a collar 65 is illustrated as having a pressed-in ring 66 for facilitating the machining of the slots in the body thereof. Otherwise, the collar is the same as the collar 26 illustrated in FIGS. 1 and 2.

What is claimed is:

1. In a deburring tool, an elongated body of substantially uniform cross section having a longitudinally disposed slot at one end and a communicating aperture extending through the opposite end thereof, a blade disposed in said slot having projections extending outwardly from one side at opposite ends of the blade, one of said projections forming a nib containing at least one cutting edge, the other projection forming a fulcrum arm, a bushing extending over the slotted end of said body and engaging the end of the arm to form a fulcrum relationship, and spring means within said aperture engaging the end of the blade adjacent to said fulcrum arm for urging the nib at the opposite end from said slot into cutting position.

2. In a deburring tool, an elongated body of substantially uniform cross section having a longitudinally disposed slot at one end and a communicating aperture extending through the opposite end thereof, a free floating blade disposed in said slot having projections extending outwardly from one side at opposite ends of the blade, one of said projections forming a nib containing at least one cutting edge, the other projection forming a fulcrum arm, a bushing extending over the slotted end of said body and engaging the end of the arm to form a fulcrum relationship, and stop means on said blade adjacent to said fulcrum arm for limiting the outward projection of said nib.

3. In a deburring tool, an elongated body of substantially uniform cross section having a longitudinally disposed slot at one end and a communicating aperture extending through the opposite end thereof, a free floating blade disposed in said slot having projections extending outwardly from one side at opposite ends of the blade, one of said projections forming a nib containing at least one cutting edge, the other projection forming a fulcrum arm, a bushing extending over the slotted end of said body and engaging the end of the arm to form a fulcrum relationship, stop means on said blade adjacent to said fulcrum arm for limiting the outward projection of said nib, and means for securing said bushing to the medial portion of said body.

4. In a deburring tool, an enlongated body of substantially uniform cross section having a longitudinally disposed slot at one end and a communicating aperture extending through the opposite end thereof, a blade disposed in said slot having projections extending outwardly from one side at opposite ends of the blade, one of said projections forming a nib containing at least one cutting edge, the other projection forming a fulcrum arm, a bushing extending over the slotted end of said body and engaging the end of the arm to form a fulcrum relationship, spring means within said aperture engaging the adjacent end of the blade for urging the nib at the opposite end from said slot, said bushing being a ring having an exterior thread, a collar having an interior thread threaded upon the threads of said ring, and support means at the medial portion of said body which is engaged by said collar.

5. A deburring tool including, in combination, an elongated body of substantially uniform cross section having an elongated transverse slot disposed lengthwise in one end of the body, a pair of elongated blades disposed lengthwise in said slot in face to face relationship on the center of rotation of said body, said blades having projections at each end extending outwardly from one side thereof, one of said projections forming a nib having cutting edges thereon, the other projection providing a fulcrum arm, a bushing on the body engaging said arms in fulcrum relation therewith, means for securing said bushing to said body, and spring means on the opposite end of said body from that containing the slot for engaging the ends of said blades and urging the nibs outwardly of the slot on opposite sides of the body.

6. A deburring tool including, in combination, an elongated body of substantially uniform cross section having an elongated transverse slot disposed lengthwise in one end of the body, a pair of elongated blades disposed lengthwise in said slot in face to face relationship on the center of rotation of said body, said blades having projections at each end extending outwardly from one side thereof, one of said projections forming a nib having cutting edges thereon, the other projection providing a fulcrum arm, a bushing on the body engaging said arms in fulcrum relation therewith, means for securing said bushing to said body, the opposite end of the body from that containing the slot having an aperture, a plunger in said aperture engaging the ends of said blades, a spring within the aperture engaging the rear of said plunger, and means adjustable on said body engaging the outer end of said spring for varying the length thereof.

7. In a deburring tool, a cylindrical body of substantially uniform diameter containing a transverse slot at one end located substantially on the center line thereof, a pair of blades disposed in said slot the mating faces of which fall in a plane through the axis of the body and slot, each said blade having a projection at each end extending from one side thereof, one of said projections forming nibs extending from the slot and having at least one cutting edge thereon, a bushing extending over said body and engaging the other projections on said blades, means for securing said bushing to said body, and spring means at the opposite end of said body for engaging the adjacent ends of the blades for urging the nibs outwardly thereof.

8. In a deburring tool, a cylindrical body of substantially uniform diameter containing a transverse slot at one end located susbtantially on the center line thereof, a pair of blades disposed in said slot the mating faces of which fall in a plane through the axis of the body and slot, each said blade having a projection at each end extending from one side thereof, one of said projections forming nibs extending from the slot and having at least one cutting edge thereon, a bushing extending over said body and engaging the other projections on said blades, means for securing said bushing to said body, spring means at the opposite end of said body for engaging the adjacent ends of the blades for urging the nibs outwardly thereof, and means on said blades for engaging the bushing for limiting the outward movement of said blades by said spring means.

9. In a deburring tool, a cylindrical body of substantially uniform diameter containing a transverse slot at one end located substantially on the center line thereof, a pair of blades disposed in said slot the mating faces of which fall in a plane through the axis of the body and slot, each said blade having a projection at each end extending from one side thereof, one of said projections forming nibs extending from the slot and having at least one cutting edge thereon, a bushing extending over said body and engaging the other projections on said blades, means for securing said bushing to said body, the opposite end of said body having a central aperture, a spring within said aperture engaging the rear ends of said blades, and adjustable means on said opposite end of the body in engagement with said spring for changing the length thereof.

10. A flat blade for a deburring tool having a body of substantially greater length than width, aligned arms extending from both edges of the blade at one end, and a nib having a cutting edge extending from one edge at the opposite end.

11. In a deburring tool, a cylindrical body of substantially uniform diameter containing a transverse slot at one end located substantially on the center line thereof, a pair of blades disposed in said slot the mating faces of which fall in a plane through the axis of the body and slot, each said blade having oppositely extending arms at one end and a cutting nib at the other end, an element secured to the body having a face on which one arm of each blade fulcrums, and spring means on said body in engagement with said blades for urging nibs of the blades outwardly of the body.

References Cited in the file of this patent

UNITED STATES PATENTS

| | | |
|---|---|---|
| 2,716,360 | Cogsdill et al. | Aug. 30, 1955 |
| 2,745,299 | Fried et al. | May 15, 1956 |
| 2,869,406 | Belmont | Jan. 20, 1959 |